United States Patent [19]

Kung et al.

[11] 4,008,340

[45] Feb. 15, 1977

[54] METHOD FOR STABILIZING COFFEE GRINDER GAS AROMA

[75] Inventors: Jo-Fen T. Kung, North Bergen, N.J.; William P. Clinton, Monsey; Robert J. Soukup, New City, both of N.Y.

[73] Assignee: General Foods Corporation, White Plains, N.Y.

[22] Filed: May 21, 1973

[21] Appl. No.: 362,603

[52] U.S. Cl. .............................. 426/651; 426/594; 426/387; 426/429; 426/487
[51] Int. Cl.² .......................................... A23F 1/04
[58] Field of Search .......... 426/492, 387, 429, 432, 426/386, 388, 487, 650, 651, 541, 594

[56] References Cited

UNITED STATES PATENTS

| 1,292,458 | 1/1919 | Hamor et al. | 426/386 |
|---|---|---|---|
| 1,367,724 | 2/1921 | Trigg | 426/429 X |
| 3,155,523 | 11/1964 | Reich | 426/386 X |
| 3,649,296 | 3/1972 | Friedman | 426/386 X |
| 3,821,447 | 6/1974 | Jasovsky et al. | 426/386 |

FOREIGN PATENTS OR APPLICATIONS 246,454  10/1926  United Kingdom ............... 426/386

OTHER PUBLICATIONS

Coffee Processing Technology vol. 2 by Sivetz, published by Avi Pub. Co., Westport, Conn. 1963, p. 172.

*Primary Examiner*—Frank W. Lutter
*Assistant Examiner*—N. Greenblum
*Attorney, Agent, or Firm*—Thomas R. Savoie; Bruno P. Struzzi; Thomas V. Sullivan

[57] ABSTRACT

Grinder gas aroma evolved from the comminution or fracturing of freshly roasted coffee beans is stabilized by condensing the gas and adding an oxygen scavenger to the condensate. This condensate is then briefly contacted and extracted with a fluorinated-chlorinated hydrocarbon to remove harsh aroma compounds and then with a mixture of non-polar and polar solvents in order to extract desirable aromatics. This extract is stable at freezer temperatures and can be used to aromatize coffee or coffee-like products.

11 Claims, No Drawings

METHOD FOR STABILIZING COFFEE GRINDER GAS AROMA

BACKGROUND OF THE INVENTION

Grinder gas, that is the gas which is released from roasted whole coffee beans when their internal cell structure is disrupted, such as during grinding of the beans and which also continues to evolve from the disrupted and/or fractured beans for a short period thereafter, has long been recognized in the art as a highly desirable natural coffee aroma. The collection and stabilization of this aroma has, however, proven to be a difficult undertaking.

The use of grinder gas aromatics as a means to enhance the jar aroma of a soluble coffee powder is disclosed in U.S. Pat. No. 3,021,218 to Clinton et al. which aromatizes the jar headspace and U.S. Pat. No. 2,306,061 to Johnston which condenses grinder gas aromatics onto chilled soluble powder. The use of grinder gas condensates which are added to a liquid extract and dried in order to produce an improved cup aroma when the powder is dissolved in hot water is disclosed in U.S. Pat. No. 3,244,533 to Clinton et al. which homogenizes coffee oil in extract and then adds condensed grinder gas aromatics and in co-pending, commonly-assigned patent application, Ser. No. 252,883, filed May 12, 1972, U.S. Pat. No. 3,821,447 which mixes condensed grinder gas with a liquid glyceride which mixture is then processed to remove excess water, such as by centrifugation, prior to being added to liquid extract which is then freeze dried.

SUMMARY OF THE INVENTION

Grinder gas obtained by disrupting the cellular structure of freshly roasted coffee beans is condensed as a frost or snow at temperature below −80° C, preferably by means of liquid nitrogen. A small amount of dry ascorbic acid is combined with this condensate in order to quickly impart a degree of stability to the grinder gas aromatics and the condensate is permitted to at least partially liquify, preferably without the use of external heat.

The condensate is briefly contacted and extracted with a relatively low boiling point fluorinated-chlorinated hydrocarbon such as "Freon 113" ($CCl_2F$-$CClF_2$), which is subsequently removed as a separate phase, containing undesirable aromatics. The remaining condensate is then extracted with a mixture of a non-polar and a polar liquid solvents, such as $C_5$ to $C_6$ alkanes and ethanol.

The resulting extract is substantially water-free and is very stable at freezer temperatures for periods of six months or more. This stabilized grinder gas extract exhibits a balanced aroma containing the roasted, toasted, winey, buttery, nutty and slightly sulfury notes which are characteristic of fresh grinder gas.

The stabilized grinder gas extract of this invention may be used as is or as a source of grinder gas aromatics for aromatizing either coffee extract prior to drying the extract or soluble coffee powder.

DETAILED DESCRIPTION OF THE INVENTION

The most readily available source of grinder gas may be obtained by enclosing or hooding coffee grinding equipment, such as the commercial Gump grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of freshly roasted coffee beans. If pumping is employed it may be desirable to cool the gas ahead of the pump so that the heat added by pumping will not deteriorate the aromatics contained in the gas.

The chemical composition of grinder gas is largely carbon dioxide together with water vapor and the characteristic aromatic constituents of roasted coffee. The amount of moisture in the gas may be lowered by the use of low-moisture green beans, dry roasting conditions and low-moisture quencher or quenching mediums. The evolved grinder gas may be passed through a first condenser where it is cooled to between about 35° and 50° F and where substantial quantities of water are removed. The grinder gas is then passed into a condenser such as a jacketed, vertically-mounted, scraped-wall heat exchanger which is cooled by means of a liquid gas refrigerant such as liquid nitrogen. The grinder gas is cooled to a temperature of below −80° C where it is condensed as a frost, and the frost is collected.

The grinder gas aromatics present in the frost are unstable and deteriorates quickly after collection, even when held at low temperatures. Contacting the frost with a liquid glyceride such as vegetable oil followed by centrifugation to remove most of the water is one stabilization technique that has been employed with some success; however, the stability of this "dry" aromatized oil is limited to a period of several weeks, even at low temperature, and the aroma of the oil does not contain the desirable roasted note. By means of the stabilization techniques of this invention, a low-temperature storage stability of 6 months or more together with a retention of the well-balanced aroma, containing the heretofore difficult to isolate and maintain roasted note, of fresh grinder gas can be obtained.

According to this invention the condensed grinder gas is given a degree of stability by combining fresh grinder gas frost with dry, powdered ascorbic acid or its salts. The ascorbic acid serves one of its known functions, namely that of a reducing agent or oxygen scavenger. It has been found however that ascorbic acid and its salts are particularly suited for stabilizing the condensed grinder gas aromatics. Other known antioxidants (e.g. butylated hydroxyanisole, propyl gallate, hydroxyquinone, etc.) are not considered to be functionally equivalent either by their failure to effectively stabilize and/or their tendency to interact with the grinder gas aromatics. Preferably the ascorbic acid is employed in an amount between about 3 and 10%, preferably 3 to 5%, by weight of the frost and contact between the ascorbic acid and the grinder gas aromatics should be accomplished before the frost is permitted to thaw.

The ascorbic acid stabilized grinder gas frost is permitted to warm, preferably without heating, so that a somewhat fluid consistency is obtained, and this material is extracted with a fluorinated-chlorinated hydrocarbon liquid, preferably one having a boiling point between about 10° and 60° C (e.g. "Freon 113"-B.P. 48° C). The fluorinated-chlorinated hydrocarbon should be used at a level of about 3 to 10, preferably between about 3 to 5 ml of the liquid for each 100 grams of grinder frost. The fluorinated-chlorinated hydrocarbon and condensed grinder gas aromatics are briefly contacted, such as being shaken in a separation funnel, in order to enable the hydrocarbon liquid to extract or pick-up some of the grinder gas aromatics. Contact time between the condensed aromatics and the liquid hydrocarbon should be kept to a minimum in order to avoid excessive extraction of aroma. It has been found that the selectivity of fluorinated-chlorinated hydrocarbon liquids is such that the initial aromatics extracted contain the undesirable green tobaccoy and phenolic notes. The fluorinated-chlorinated hydrocarbon phase is then separated from the lighter water phase.

This water phase is then briefly contacted and extracted with a mixed non-polar-polar solvent containing, on a volume basis, about 70 to 90%, preferably about 80%, of the non-polar liquid. The solvent mixture should be used at a level of at least 5 to 12 ml. and preferably between about 6 to 8 ml of solvent for each 100 grams of the initial grinder gas frost. Normally it will be desirable to use a low amount of solvent so that the aroma will be relatively concentrated in the solvent. The non-polar liquid is an aliphatic material, preferably a relatively low-boiling point alkane such as pentane or hexane. The polar liquid is an alcohol, usually ethanol. Contact between the water phase and mixed solvents is maintained only long enough to permit the non-polar solvent to absorb most of the aromatics. Presence of the polar solvent, some of which passes into the water phase, appears to assist in the extraction of aromas by the non-polar solvent. The water phase is then separated from the lighter solvent phase. This water phase is found to contain little aroma.

The aroma-containing non-polar-polar solvent extract was found to possess good grinder gas aroma, including a roasted note. The extract is preferably kept out of direct light and stored at freezer temperatures until ready for use. As will be appreciated by those skilled in the art it will be desirable during the practice of this invention to minimize the contact between the grinder gas aromatics and water or air and also to maintain the temperature of these aromatics as low as practical.

The stabilized aromatic extract of this invention may be used in any of the manners well-known in the art, such as by adding it directly to coffee extract which is then dried (e.g. spray or freeze drying). Drying conditions should be employed which will maximize the removal of any residual fluorinated-chlorinated hydrocarbon as well as removing most of the non-polar solvent. Transfer of the grinder gas aromas onto oil-plated or chilled, oil-plated soluble coffee powder may also be accomplished by various aroma transfer or vaporization techniques well-known to those skilled in the art such as illustrated by U.S. Pat. Nos. 2,542,119 to Cole and 2,563,233 to Gilmont.

The term coffee powder and coffee extract used in the description of this invention is meant to include materials containing in whole or in part coffee substitutes such as powders or extracts obtained in whole or in part from roasted cereals such as wheat, rye, barley and the like. One such item is the water extract and resulting dried powder of wheat, barley and molasses known as "Instant Postum".

Naturally, the aromatized soluble coffee produced in accordance with this invention may be used as a final product or as a fractional component or a coffee product.

This invention is further described but not limited by the following examples.

EXAMPLE 1

A one-liter Erlenmeyer flask, with a thin layer of ascorbic acid sprinkled on its bottom and precooled in dry ice, was filled up with fresh grinder gas frost (about 200 grams) collected from the bottom of a vertically-mounted, liquid nitrogen-cooled, scraped-wall heat exchanger (Contherm-DeLaval Separator Co.) which is connected by suitable piping to a series of Gump coffee mills continuously grinding freshly roasted coffee. The surface of frost in the flask was then covered with ascorbic acid, the total acid weight used being 4% of the weight of the frost. The flask was removed from the dry ice and warmed up gradually without heating until the frost became icy lumps. Thereafter 6 ml of "Freon 113" ($Cl_2FC$-$CClF_2$) were slowly poured into the flask. The mixture was transferred into a separatory funnel and shaken vigorously for one minute. The "Freon" phase, which contained green tobaccoy and phenolic notes, was drained off and discarded. The water phase was extracted with 12 ml of the mixed solvent, hexane-ethanol (80:20 by volume). After separation in a separatory funnel the water residue, containing little aroma, was drained off and discarded. The hexane-ethanol extract with a good natural grinder gas aroma, notable for the fact that a roasted aroma note was present, was placed in a brown glass bottle and stored in a freezer. After a period of 6 months the aroma of the hexane-ethanol extract was not found to have significantly deteriorated, and the roasted note was still present.

EXAMPLE 2

The procedure of Example 1 was followed with the exception that no ascorbic acid was used. The resulting hexane-ethanol extract possessed an initial aroma comparable to that of Example 1; however, off-notes (e.g. oniony) developed overnight during freeze storage in a brown glass bottle.

Having thus described the invention, what is claimed is:

1. A method of stabilizing coffee grinder gas aroma comprising the steps of:
   a. disrupting the cellular structure of freshly roasted coffee beans,
   b. condensing the evolved gas as a frost, at a temperature below −80° C,
   c. combining the condensed frost with powdered ascorbic acid or salts thereof in an amount between about 3 and 10% by weight of the condensate, thereafter
   d. permitting the frost to warm to a fluid consistency,
   e. briefly contacting the fluid condensate with a fluorinated hydrocarbon liquid in order to enable the liquid to extract the green tobaccoy and phenolic notes and thereafter
   f. separating the fluorinated-chlorinated hydrocarbon liquid from the condensate,
   g. thereafter, contacting the condensate with a mixed non-polar-polar solvent, containing 70 to 90% non-polar liquid on a volume basis, and at a level of at least 5 ml of the solvent mixture for each 100 grams of the grinder gas condensate, in order to permit the non-polar solvent to absorb most of the condensed aromatics, and then h. separating the condensated residue as an aqueous phase from the lighter, stabilized, aroma-containing solvent phase.

2. The method of claim 1 wherein the gas is condensed by means of liquid nitrogen.

3. The method of claim 2 wherein the non-polar solvent consists of low-boiling point alkanes.

4. The method of claim 3 wherein the non-polar solvent is pentane or hexane.

5. The method of claim 3 wherein the polar solvent is an alcohol.

6. The method of claim 5 wherein the alcohol is ethanol.

7. The method of claim 5 wherein the solvent mixture is used at a level between about 5 and 12 ml of solvent per 100 grams of initial condensate.

8. The method of claim 7 wherein the ascorbic acid is used in an amount between 3 and 5% by weight of the condensate.

9. The method of claim 7 wherein the fluorinated-chlorinated hydrocarbon has a boiling point between about 10 and 60° C and is used at a level of about 3 to 10 ml for each 100 grams of condensate.

10. The method of claim 9 wherein the fluorinated-chlorinated hydrocarbon is $Cl_2FC-CClF_2$.

11. The method of claim 9 wherein the non-polar solvent is pentane or hexane.

* * * * *